United States Patent
Van Miltenburg et al.

(10) Patent No.: US 11,098,137 B2
(45) Date of Patent: Aug. 24, 2021

(54) PROCESS AND SYSTEM FOR VAPOR PHASE POLYMERIZATION OF OLEFIN MONOMERS

(71) Applicant: SABIC GLOBAL TECHNOLOGIES B.V., Bergen Op Zoom (NL)

(72) Inventors: Arjen Van Miltenburg, Geleen (NL); Rita Ferreira Tavares, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 172 days.

(21) Appl. No.: 16/468,082

(22) PCT Filed: Dec. 5, 2017

(86) PCT No.: PCT/EP2017/081470
§ 371 (c)(1),
(2) Date: Feb. 20, 2020

(87) PCT Pub. No.: WO2018/108621
PCT Pub. Date: Jun. 21, 2018

(65) Prior Publication Data
US 2020/0071427 A1    Mar. 5, 2020

(30) Foreign Application Priority Data
Dec. 12, 2016 (EP) .................................. 16203356

(51) Int. Cl.
*C08F 2/34* (2006.01)
*C08F 2/01* (2006.01)
(Continued)

(52) U.S. Cl.
CPC .............. *C08F 2/34* (2013.01); *B01J 19/248* (2013.01); *C08F 2/01* (2013.01); *C08F 10/06* (2013.01);
(Continued)

(58) Field of Classification Search
CPC ..... C08F 2/34; C08F 2/01; C08F 10/06; B01J 19/248; B01J 2219/0004; B01J 2219/182
(Continued)

(56) References Cited

U.S. PATENT DOCUMENTS 4,399,054 A  8/1983  Ferraris et al.
4,420,592 A  12/1983 Kato et al.
(Continued)

FOREIGN PATENT DOCUMENTS

CN         1887916 A   *  1/2007
WO     2006010414 A1      2/2006
(Continued)

OTHER PUBLICATIONS

"Polypropylene", R. Lieberman et al., Kirk-Othmer Encyclopedia of Chemical Technology, Wiley, 2006.
(Continued)

*Primary Examiner* — William K Cheung
(74) *Attorney, Agent, or Firm* — Cantor Colburn LLP

(57) ABSTRACT

The present invention relates to a continuous vapor phase olefin polymerization process comprising polymerization of at least one olefin monomer in at least two serial polymerization reactors containing an agitated bed of forming polymer particles, wherein forming polymer particles are transferred from an upstream reactor to a downstream reactor, wherein the upstream reactor is a horizontal stirred reactor containing multiple reaction zones, each reaction zone having at least one inlet for a gaseous stream and optionally additionally an inlet for a liquid stream, wherein said process reduces the carry over of undesired reactive gases from the upstream reactor to the downstream reactor. The present invention further relates to a system suitable for the present continuous vapor phase olefin polymerization process. The present invention further relates to the use of the present
(Continued)

process and system for producing heterophasic polypropylene.

18 Claims, 3 Drawing Sheets

(51) Int. Cl.
*C08F 10/06* (2006.01)
*B01J 19/24* (2006.01)

(52) U.S. Cl.
CPC .. *B01J 2219/0004* (2013.01); *B01J 2219/182* (2013.01)

(58) Field of Classification Search
USPC .......................................................... 526/65
See application file for complete search history.

(56) References Cited

U.S. PATENT DOCUMENTS

| | | |
|---|---|---|
| 4,472,524 A | 9/1984 | Albizzati |
| 6,069,212 A | 5/2000 | Hung et al. |
| 7,524,903 B2 * | 4/2009 | Mei .................. B01J 8/1863 525/240 |

FOREIGN PATENT DOCUMENTS

| | | |
|---|---|---|
| WO | 2008058839 A2 | 5/2008 |
| WO | WO 2008/058839 A2 * | 5/2008 |

OTHER PUBLICATIONS

International Search Report; International Application No. PCT/EP2017/081470; International Filing Date: Dec. 5, 2017; dated Apr. 11, 2018; 4 pages.

Ser van der Ven, "Polypropylene and other Polyolefins: Polymerization and Characterization," Studies in Polymer Science 7, Elsevier (1990), pp. 1-11.

Written Opinion; International Application No. PCT/EP2017/081470; International Filing Date: Dec. 5, 2017; dated Apr. 11, 2018; 7 pages.

* cited by examiner

PROCESS AND SYSTEM FOR VAPOR PHASE POLYMERIZATION OF OLEFIN MONOMERS

CROSS REFERENCE TO RELATED APPLICATIONS

This application is a 371 of International Application No. PCT/EP2017/081470, filed Dec. 5, 2017, which is incorporated by reference in its entirety, and which claims priority to European Application Serial No. 16203356.7, filed Dec. 12, 2016.

BACKGROUND

The present invention relates to a continuous vapor phase olefin polymerization process comprising polymerization of at least one olefin monomer in at least two serial polymerization reactors containing an agitated bed of forming polymer particles, wherein forming polymer particles are transferred from an upstream reactor to a downstream reactor, wherein the upstream reactor is a horizontal stirred reactor containing multiple reaction zones, each reaction zone having at least one inlet for a gaseous stream and optionally additionally an inlet for a liquid stream, wherein said process reduces the carry-over of undesired reactive gases from the upstream reactor to the downstream reactor. The present invention further relates to a system suitable for the present continuous vapor phase olefin polymerization process. The present invention further relates to the use of the present process and system for producing heterophasic polypropylene.

The prior art previously described continuous olefin polymerization processes comprising polymerization of at least one olefin monomer in at least two serial vapor phase polymerization reactors containing an agitated bed of forming polymer particles, comprising a polymer particles transfer step wherein forming polymer particles are transferred from an upstream reactor to a downstream reactor.

U.S. Pat. No. 4,420,592 describes a process for the polymerization of an olefin in the gaseous phase in a multiplicity of steps in at least two independent polymerization zones connected to each other by a transfer passage, which comprises feeding an olefin and a catalyst into a first polymerization zone, polymerizing the olefin in the gaseous phase, intermittently or continuously withdrawing a gaseous stream containing the resulting polymer from the first zone and feeding it into said transfer passage, introducing the withdrawn polymer-containing gaseous stream into a second polymerization zone through the transfer passage, feeding the olefin into the second zone, wherein an inert gas zone is provided in the transfer passage and at least a part of the gas components of the gaseous stream containing the polymer is replaced by an inert gas. It is taught in U.S. Pat. No. 4,420,592 that by substituting an inert gas for at least a part of the polymer-containing gaseous stream in the transfer passage it is possible to select desired polymerization conditions for the second polymerization zone.

U.S. Pat. No. 6,069,212 describes a method and apparatus for continuous vapor phase polymerization of a polymerizable monomer or mixture thereof to produce normally solid polymer substances in two or more serially disposed vapor phase polymerization reactors, each containing a quench-cooled subfluidized particulate bed of polymerized monomers, which allows maintaining each reactor at independently selected operating conditions. The process of U.S. Pat. No. 6,069,212 includes:

(a) discharging a slug containing polymer particles and reactive gases from an upstream reactor, (b) collecting the polymer particles in a transfer chamber having side walls which are vertical and/or inclined toward a bottom discharge port at an angle of less than about 20° from vertical, while maintaining the pressure therein at least 5 psi (35 kPa) below the operating pressure of the upstream reactor, (c) repeating steps (a) and (b) to detach a suitable mass of polymer particles from the bed in the upstream reactor, (d) displacing a substantial portion of the reactive gases from the collected polymer particles and the transfer chamber with a purge gas having a composition which is compatible with the independently selected operating conditions in each reactor, and different from the composition of reactive gases in the upstream reactor, (e) pressurizing the transfer chamber gas pressure to at least 1 psi (7 kPa), preferably at least 2 psi (14 kPa), above the operating pressure of the downstream reactor to facilitate transfer of the polymer particles from the transfer chamber into the downstream reactor, and (f) dumping the polymer particles from the transfer chamber into the downstream reactor.

CN1887916 discloses continuous vapor phase polymerization of olefin homopolymers in two serially disposed vapor phase polymerization reactors separated by partition boards into several polymerization areas.

A major drawback of the processes of U.S. Pat. Nos. 4,420,592 and 6,069,212 is that the described substitution of at least a part of the polymer-containing gaseous stream by an inert gas or an purge gas in the transfer passage is not sufficient to eliminate the carry-over of certain components comprised in the gaseous stream containing the polymer that is withdrawn from the first/upstream reaction zone or reactor to the second/downstream reaction zone or reactor.

BRIEF SUMMARY

In an aspect, a continuous vapor phase olefin polymerization process comprises polymerization of at least one olefin monomer in at least two serial vapor phase polymerization reactors containing an agitated bed of forming polymer particles, wherein forming polymer particles are transferred from an upstream reactor to a downstream reactor, wherein the upstream reactor is a horizontal stirred reactor containing multiple reaction zones, each reaction zone having at least one inlet for a gaseous stream and optionally additionally an inlet for a liquid stream and, wherein one reaction zone comprised in the upstream reactor vessel is a polymer discharge reaction zone from which forming polymer particles are discharged and subsequently transported to the downstream reactor and wherein the ratio of the hydrogen concentration to the olefin monomer concentration in the polymer discharge reaction zone ($[H_2]_{discharge\ zone}$/$[Olefin\ monomer]_{discharge\ zone}$) is reduced compared to the ratio of the hydrogen concentration to the olefin monomer concentration in the preceding reactor zone ($[H_2]_{preceding\ zone}$/$[Olefin\ monomer]_{preceding\ zone}$).

DETAILED DESCRIPTION

Figure 1:
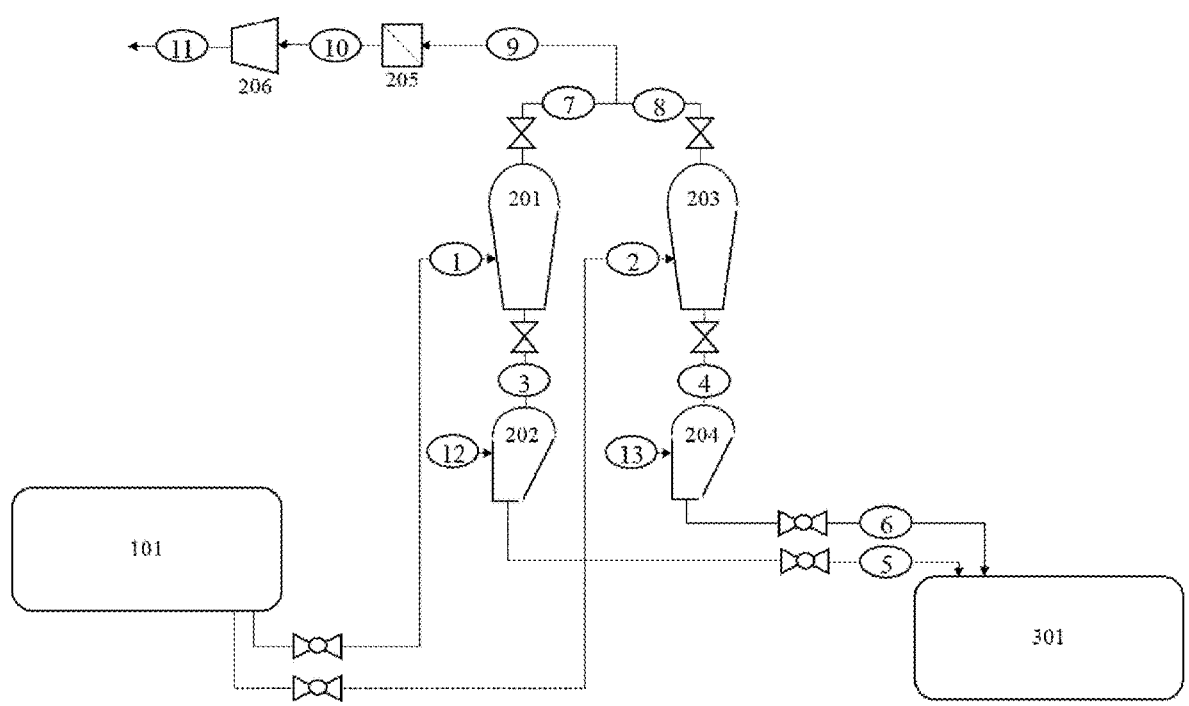
FIG. 1 illustrates a system according to the prior art.

It was an object of the present invention to provide a continuous olefin polymerization process comprising polymerization of at least one olefin monomer in at least two serial vapor phase polymerization reactors containing an agitated bed of forming polymer particles wherein the carry-over of reactive gases from the upstream reactor to the downstream reactor is further reduced.

The solution to the above problem is achieved by providing the embodiments as described herein below and as characterized in the claims. This process is also presented in FIG. 2 which is further described herein below.

Accordingly, the present invention provides a continuous vapor phase olefin polymerization process comprising polymerization of at least one olefin monomer in at least two serial polymerization reactors containing an agitated bed of forming polymer particles, wherein forming polymer particles are transferred from an upstream reactor to a downstream reactor, wherein the upstream reactor is a horizontal stirred reactor containing multiple reaction zones, each reaction zone having at least one inlet for a gaseous stream and optionally additionally an inlet for a liquid stream and, wherein one reaction zone comprised in the upstream reactor vessel is a polymer discharge reaction zone from which forming polymer particles are discharged and subsequently transported to the downstream reactor and wherein the ratio of the hydrogen concentration to the olefin monomer concentration in the polymer discharge reaction zone ($[H_2]_{discharge\ zone}$/[Olefin monomer]$_{discharge\ zone}$) is reduced compared to the ratio of the hydrogen concentration to the olefin monomer concentration in the preceding reactor zone ($[H_2]_{preceding\ zone}$/[Olefin monomer]$_{preceding\ zone}$).

In other words, the present invention provides a continuous vapor phase olefin polymerization process comprising polymerization of at least one olefin monomer in at least two serial polymerization reactors containing an agitated bed of forming polymer particles, wherein forming polymer particles are transferred from an upstream reactor to a downstream reactor, wherein the upstream reactor is a horizontal stirred reactor containing multiple reaction zones, each reaction zone having at least one inlet for a gaseous stream and optionally additionally an inlet for a liquid stream and, wherein one reaction zone comprised in the upstream reactor vessel is a polymer discharge reaction zone from which forming polymer particles are discharged and subsequently transported to the downstream reactor and wherein $$\frac{[H_2]_{preceding\ zone}/[\text{Olefin monomer}]_{preceding\ zone}}{[H_2]_{discharge\ zone}/[\text{Olefin monomer}]_{discharge\ zone}}$$

is more than 1.
Preferably, $$\frac{[H_2]_{preceding\ zone}/[\text{Olefin monomer}]_{preceding\ zone}}{[H_2]_{discharge\ zone}/[\text{Olefin monomer}]_{discharge\ zone}}$$

is more than 1.1, more preferably more than 1.2, even more preferably more than 1.3 and particularly preferably more than 1.4.

In the context of the present invention, it was surprisingly found that by reducing the ratio of the hydrogen concentration to the olefin monomer concentration in the polymer discharge reaction zone compared to the ratio of the hydrogen concentration to the olefin monomer concentration in the preceding reactor zone, the carry-over of hydrogen from the upstream reactor to the downstream reactor can be significantly reduced, without inducing a significant negative impact on the characteristics of the polymer product produced by the process of the present invention.

Preferably, the ratio $$\frac{[H_2]_{preceding\ zone}/[\text{Olefin monomer}]_{preceding\ zone}}{[H_2]_{discharge\ zone}/[\text{Olefin monomer}]_{discharge\ zone}}$$

is 1.5-15, more preferably the ratio $$\frac{[H_2]_{preceding\ zone}/[\text{Olefin monomer}]_{preceding\ zone}}{[H_2]_{discharge\ zone}/[\text{Olefin monomer}]_{discharge\ zone}}$$

is 2-10 and most preferably the ratio $$\frac{[H_2]_{preceding\ zone}/[\text{Olefin monomer}]_{preceding\ zone}}{[H_2]_{discharge\ zone}/[\text{Olefin monomer}]_{discharge\ zone}} \text{ is } 3\text{-}7.$$

The prior art teaches that the reactive gases discharged with the forming polymer powder to the gas-solid separator/pressure transfer chamber system can be removed by means of purging with a gas compatible with the conditions in the downstream reactor. However, it was found that the effect of the purging is not optimal, particularly when producing an impact PP copolymer. Without being bound to theory, it is believed that part of the reaction gases carried-over from the upstream reactor to the downstream reactor is contained in the pores and/or internal voids of the forming polymer particles. In order to minimize the carry-over at least a part of these reaction gases comprised in the forming polymer particle pores must have a composition that is compatible with the conditions in the downstream reactor before said forming polymer particles are discharged into the downstream reactor. It was surprisingly found that this effect can be achieved using the process and the system of the present invention without having a significant negative impact on the characteristics of the polymer particles produced by the process of the present invention. Particularly for materials with a high melt index, such as a PP homopolymer produced in an upstream polymerization reactor used in a process for producing heterophasic polypropylene copolymer grades, the intraparticle porosity may be relatively high as the forming PP polymer particles are particularly porous. The purging step as proposed in the prior art does not have a significant effect on the reactive gases contained in the intraparticle space, resulting in that these reactive gases are carried-over into the downstream reactor. Particularly in a process for the production of high impact PP copolymer grades, the amount of hydrogen entering the downstream polymerization reactor via the forming polymer powder transfer system may be higher than the hydrogen content that can be tolerated when producing a low melt flow index material.

Preferably, one or more liquid streams to one or more reaction zones and/or one or more gaseous streams to one or more reaction zones are controlled to achieve the desired ratios of the hydrogen concentration to the olefin monomer concentration in the reaction zones.

Preferably, the liquid stream to at least one reaction zone is a liquid reactor recycle stream optionally further comprising an inert diluent or the olefin monomer, wherein said inert diluent is preferably one or more selected from the group consisting of nitrogen, fuel gas, methane, ethane and propane and wherein said olefin monomer preferably is ethylene and/or propylene. The olefin monomer in the liquid recycle stream is the olefin used for producing the polymer particles. In a process for producing polypropylene, accordingly, the olefin monomer in the liquid recycle stream preferably is propylene, whereas in a process for producing random PP copolymer the olefin monomer in the liquid recycle stream preferably is a mixture of ethylene and propylene. The effect of using the monomer is that the discharge zone still contributes to the reaction time.

Preferably, the gaseous stream to at least one reaction zone comprises a gaseous recycle stream optionally further comprising an inert diluent or the olefin monomer, wherein said inert diluent is preferably one or more selected from the group consisting of nitrogen, fuel gas, methane, ethane and propane and wherein said olefin monomer preferably is ethylene and/or propylene. The olefin monomer in the gaseous recycle stream preferably is the olefin used for producing the polymer particles. In a process for producing polypropylene, accordingly, the olefin monomer in the gaseous recycle stream preferably is propylene, whereas in a process for producing random PP copolymer the olefin monomer in the gaseous recycle stream preferably is ethylene and propylene.

Preferably, the liquid stream to the polymer discharge reaction zone and/or the gaseous to the polymer discharge reaction zone is propylene. Preferably, the propylene is polymer grade propylene consisting of at least 99.7 wt-% propylene.

The upstream reactor used in the process of the present invention is a horizontal stirred reactor, preferably with semi-plug flow behavior.

Preferably, forming polymer particles are transferred from the upstream reactor to the downstream reactor in a forming polymer particles transport step comprises in a repeating sequence the steps of:

(a) discharging at least one charge of forming polymer powder and reactive gases from the upstream reactor into a gas-solid separator wherein the polymer powder is separated from the reactive gases;

(b) collecting the polymer powder separated in the gas-solid separator in a pressure transfer chamber;

(c) increasing the pressure in the pressure transfer chamber with a pressurizing gas to a pressure that is higher than the operating pressure of the downstream reactor;

(d) discharging the polymer powder from the pressure transfer chamber into the downstream reactor, and (e) opening the valve between the gas-solid separator and the pressure transfer chamber wherein the pressure in the pressure transfer chamber before said discharging at least one charge of forming polymer powder and reactive gases from the upstream reactor into the gas-solid separator is 10-700 kPaa, preferably 90-500 kPaa and most preferably 105-200 kPaa.

In the context of the present invention, it was surprisingly found that by reducing the pressure in the pressure transfer chamber before discharging at least one charge of forming polymer powder and reactive gases from the upstream reactor into the gas-solid separator is 10-700 kPaa, preferably at 90-500 kPaa and most preferably at 105-200 kPaa, the carry-over of hydrogen from the upstream reactor to the downstream reactor can be further reduced.

Accordingly, the pressure in the pressure transfer chamber before discharging at least one charge of forming polymer powder and reactive gases from the upstream reactor into the gas-solid separator is at least 10 kPaa (kPa absolute pressure), preferably at least 90 kPaa, most preferably at least 105 kPaa and not more than 700 kPaa, preferably not more than 500 kPaa and most preferably not more than 200 kPaa. In general, a more reduced pressure, such as a pressure that is below the ambient pressure, leads to a reduction in the carry-over of undesired components comprised in the reactive gases of the upstream reactor to the downstream reactor. However, it may be advantageous to select a pressure that is slightly above the ambient pressure to reduce the risk of leakage of atmospheric gases into the gas-solid separator/pressure transfer chamber system. The presence of certain atmospheric gases, such as oxygen, in the reactors may disturb the polymerization reaction.

Accordingly, the continuous olefin polymerization process of the present invention preferably comprises a polymer particles transfer step comprising a repeating sequence of steps, wherein the last step in the sequence is followed again by the first step in the sequence, thereby achieving a continuous transfer of forming polymer particles from the upstream reactor via the forming polymer powder transfer system to the downstream reactor.

The polymer particles transfer step in a first substep (a) may comprise that at least one charge of forming polymer powder and reactive gases from the upstream reactor is discharged into a gas-solid separator. This first step (a) preferably involves opening and subsequently closing a valve between the upstream reactor and the gas-solid separator. Gas-solid separators suitable in the process of the present invention may function as a cyclone and are well-known in the art. For instance, the gas-solid separator may have an elongates shape having for the forming polymer powder and reactive gases from the upstream reactor at the side of the gas-solid separator, an outlet for the offgas, preferably towards the offgas gas compressor, at the top of the gas-solid separator and an outlet of the polymer powder towards the pressure transfer chamber at the bottom of the gas-solid separator. Step (a) of the present invention may involve discharging more than one charge, for instance up to 8 charges, preferably up to 6 charges, more preferably up to 4 charges of forming polymer powder and reactive gases into the gas-solid separator.

The polymer particles transfer step in a subsequent substep (b) may comprise that the polymer powder separated in the gas-solid separator is collected in a pressure transfer chamber. Said pressure transfer chamber is preferably situated underneath the gas-liquid separator so that the polymer powder is collected in the pressure transfer chamber by gravity.

Preferably following substep (b) of the polymer particles transfer step, the gases in the pressure transfer chamber and gas-solid separator are displaced with a purge gas. The optional purging step with a purge gas displaces the reactive gases comprised in the gas-solid separator/pressure transfer chamber system, particularly the reactive gases comprised in the interparticle space of the forming polymer powder. Any gas that is compatible with the conditions in the downstream reactor may be selected as purge gas. The purge gas may be selected from the group consisting of one or more selected from the group consisting of nitrogen, fuel gas, methane, ethane propane, ethylene and propylene, preferably propylene, most preferably polymer grade propylene consisting of at least 99.7 wt-% propylene.

The polymer particles transfer step in a subsequent sub-step (c) may comprise that a valve between the gas-solid separator and the pressure transfer chamber is closed. The closing of this valve allows that the pressure in the pressure transfer chamber is increased with a pressurizing gas to a pressure that is higher than the operating pressure of the downstream reactor. Any gas that is compatible with the conditions in the downstream reactor may be selected as pressurizing gas. The pressurizing gas may be selected from the group consisting of one or more selected from the group consisting of nitrogen, fuel gas, methane, ethane propane, ethylene and propylene, preferably propylene, most preferably polymer grade propylene consisting of at least 99.7 wt-% propylene.

The polymer particles transfer step in a subsequent sub-step (d) may comprise that the polymer powder is discharged from the pressure transfer chamber into the downstream reactor. This discharging step preferably comprises opening and subsequently closing a valve between the pressure transfer chamber and the downstream reactor. The transport of the forming polymer particles from the pressure transfer chamber to the downstream reactor may be facilitated by a pressure gradient between the pressure transfer chamber and the subsequent reactor.

The polymer particles transfer step in a subsequent sub-step (e) may comprise that the valve between the gas-solid separator and the pressure transfer chamber is opened. The opening of this valve is required to allow equalizing of the pressure in the pressure transfer chamber and the gas-solid separator. The collecting of forming polymer powder in the pressure transfer chamber may be started again as soon as the pressure difference between the pressure transfer chamber and the gas-solid separator allows this and the valve between the pressure transfer chamber and the gas-solid separator is opened.

Preferably, the gas-solid separator is in open gas communication with the inlet of an offgas gas compressor during steps (a)-(e). It was surprisingly found that by selecting a process wherein the gas-solid separator is in open gas communication with the inlet of an offgas gas compressor during steps (a)-(e), the carry-over of hydrogen from the upstream reactor to the downstream reactor can be further reduced. This means that a similar reduction in hydrogen carry-over can be obtained at a less reduced pressure in the pressure transfer chamber before discharging the forming polymer powder from the pressure transfer chamber into the downstream reactor. Yet, there is preferably a valve situated between the gas-solid separator and the inlet of the offgas gas compressor that remains open during the repeating sequence of steps (a)-(e).

In the process of the present invention, the offgas gas compressor must be able to achieve lower pressures in the gas-solid separator/pressure transfer chamber system when compared to the processes of the prior art. Preferably, the offgas gas compressor is a multistage offgas gas compressor. A multistage offgas gas compressor, for instance a two-stage offgas gas compressor, is particularly suitable to achieve the required pressure according to the present invention.

Preferably, the gas stream from the gas-solid separator to the inlet of the offgas gas compressor is subjected to a second gas-solid separator, preferably a cyclone. Such an additional gas-solid separator may be particularly advantageous to remove the remaining forming polymer particles, particularly polymer fines. This additional gas-solid separator reduces the risk that the optional solid polymer particle filter that is situated in the offgas feed to the offgas gas compressor is blocked quickly with fines, requiring frequent filter changes.

Preferably, the polymer particles transfer step is performed in two alternating repeating sequences. Said two alternating repeating sequences is performed in a staggered mode so that the second repeating sequence is started when the first repeating sequence is halfway. Such an operation in two alternating repeating sequences allows for an easier continuous operation of the olefin polymerization process.

Preferably, each repeating sequence takes 60-600 seconds, preferably 100-300 seconds, most preferably 120-240 seconds.

Preferably, the process of the present invention involves operating the upstream reactor at different process conditions than the downstream reactor. The pressure is usually similar in both reactors. The most prominent reaction condition that may be different in the upstream reactor when compared to the downstream reactor is the ratio between the hydrogen concentration and the olefin monomer concentration. Particularly in a process for producing impact PP copolymer grades, the ratio between the hydrogen concentration and the olefin monomer concentration in the upstream reactor is much higher than the olefin monomer concentration in the downstream reactor. It should be noted that when "hydrogen concentration" is stated, this is the concentration of hydrogen, in the gas phase. It should be noted that when "olefin monomer concentration" or "olefin concentration" or "monomer concentration" is stated, this is the concentration of olefin monomer in the gas phase. The concentration of hydrogen as well as the concentration of olefin is measured using a conventional GC that is calibrated using standard mixtures and the unit is mol/m$^3$.

The process conditions useful in the process of the present invention, also described herein as "polymerization conditions", can be easily determined by the person skilled in the art; see e.g. Lieberman et al. (2006) Polypropylene. Kirk-Othmer Encyclopedia of Chemical Technology. Accordingly, the process conditions in the reactor preferably include a temperature (reactor temperature) of 50-90° C. and a pressure (reactor pressure) of 1500-3000 kPa gauge (15-30 barg). The hydrogen to olefin mol-ratio ($H_2$/olefin ratio) is set such as to obtain the required polymer, based on the kinetics of the used catalyst system. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO 06/010414, U.S. Pat. Nos. 4,399,054 and 4,472,524. The present invention is particularly useful in combination with catalysts that produce a polymer with a relatively high internal porosity, such as catalysts that produce low (bulk) density polymers, particularly low (bulk) density PP.

In a further aspect of the present invention, a system suitable for a continuous vapor phase olefin polymerization process according to the present invention is provided: a system suitable for a continuous vapor phase olefin polymerization process, comprising at least two serial polymerization reactors containing an agitated bed of forming polymer particles and a means to transfer forming polymer particles from an upstream reactor to a downstream reactor, wherein the upstream reactor is a horizontal stirred reactor containing multiple reaction zones, each reaction zone having at least one inlet for a gaseous stream and optionally additionally an inlet for a liquid stream and wherein one reaction zone comprised in the upstream reactor is a polymer discharge reaction zone comprising an outlet for forming polymer particles to the means to transfer the forming polymer particles to the downstream reactor and a means to achieve that the ratio of the hydrogen concentration to the olefin monomer concentration in the polymer discharge reaction zone ($[H_2]_{discharge\ zone}$/[Olefin monomer]$_{discharge\ zone}$) is reduced compared to the ratio of the hydrogen concentration to the olefin monomer concentration in the preceding reactor zone($[H_2]_{preceding\ zone}$/[Olefin monomer]$_{preceding\ zone}$). This system of the present invention and the process as performed in said system is inter alia presented in FIG. 2 (FIG. 2) and FIG. 3 (FIG. 3), whereas a system according to the prior art is presented in FIG. 1. It should be noted that the dotted lines shown in FIG. 3 show imaginary boundaries between zones; no physical barriers are present in this specific embodiment. In an embodiment (not shown) the discharge zone may be subdivided into multiple (for example 2) imaginary zones; in particular if the length of the so-called discharge zone comprises a large section of the reactor.

Accordingly, the present invention provides a system comprising at least two serial polymerization reactors containing an agitated bed of forming polymer particles and a means to transfer forming polymer particles from an upstream reactor to a downstream reactor, wherein the upstream reactor is a horizontal stirred reactor containing multiple reaction zones, each reaction zone having at least one inlet for a gaseous stream and optionally additionally an inlet for a liquid stream and wherein one reaction zone comprised in the upstream reactor is a polymer discharge reaction zone comprising an outlet for forming polymer particles to the means to transfer the forming polymer particles to the downstream reactor and a means to achieve that the ratio of the hydrogen concentration to the olefin monomer concentration in the polymer discharge reaction zone ($[H_2]_{discharge\ zone}$/[Olefin monomer]$_{discharge\ zone}$) is reduced compared to the ratio of the hydrogen concentration to the olefin monomer concentration in the preceding reactor zone ($[H_2]_{preceding\ zone}$/[Olefin monomer]$_{preceding\ zone}$). It should be noted that no physical zone segmentation (viz. no barriers between the zones) is needed and preferably no physical zone segmentation (viz. no barriers between the zones) is present. This has the effect that the risk of polymer powder (especially low molecular weight random PP) sticking or reactor blocking is reduced or eliminated compared to reactors having physical barriers. This process thus allows for a multipurpose use of the reactor without physical barriers. In an embodiment, the discharge zone has a volume that comprises between 20 and 50%, such as 20 to 40% preferably between 20 and 25% of the total volume of the reactor, in other words between ⅕ and ½ of the reactor volume, preferably between ⅕ and ¼ of the reactor volume. In an embodiment, each zone is ¼ or ⅕ of the total reactor volume and preferably in such an embodiment, the discharge zone is one zone, the remaining 3 or 4 zones (respectively) are the reactor zones. In an embodiment wherein the discharge zone contributes to 40 or 50%; this may be seen as ⅖ and ¾ respectively and when each zone is ⅕ or ¼ (respectively) this means the discharge zone is 2 zones out of a total of 5, respectively 4 zones.

Preferably, the means to the ratio of the hydrogen concentration to the olefin monomer concentration in the polymer discharge reaction zone comprises an inlet for a liquid reactor recycle stream optionally further comprising an inert diluent or the olefin monomer.

Preferably, the means to the ratio of the hydrogen concentration to the olefin monomer concentration in the polymer discharge reaction zone comprises an inlet for a gaseous recycle stream optionally further comprising an inert diluent or the olefin monomer.

In an embodiment, the upstream reactor comprises an internal barrier to prevent back-mixing of the forming polymer product from the polymer discharge reaction zone to one or more other reaction zones comprised in the upstream reactor; only in this embodiment there is a physical barrier Such an internal barrier has the effect of enhancing the plug flow behavior of the reactor, facilitating to maintain the difference between the reaction conditions in the polymer discharge reaction zone compared with the preceding reaction zones. Accordingly, the presence of an internal barrier in the reactor to prevent back-mixing of the forming polymer product from the polymer discharge reaction zone to one or more other reaction zones comprised in the upstream reactor allows achieving a much higher reduction of the ratio of the hydrogen concentration to the olefin monomer concentration in the polymer discharge reaction zone compared to the ratio of the hydrogen concentration to the olefin monomer concentration in the preceding reactor zone.

Preferably, the forming polymer particles are transferred from the upstream reactor to the downstream reactor using a polymer particles transport means comprising a gas-solid separator, a pressure transfer chamber and an offgas gas compressor, wherein the inlet of said offgas gas compressor is in continuous open gas communication with the gas-solid separator.

Preferably, the means to transfer forming polymer particles comprises a gas-solid separator that is connected through a valve with a pressure transfer chamber and a means to maintain the pressure in the pressure transfer chamber at 10-700 kPaa, preferably at 90-500 kPaa and most preferably at 105-200 kPaa before discharging at least one charge of forming polymer powder and reactive gases from the upstream reactor into the gas-solid separator.

Preferably, the means to maintain the pressure in the gas-solid separator is an offgas gas compressor and wherein the inlet of said offgas gas compressor is in continuous open gas communication with the gas-solid separator.

Preferably, the means to transfer forming polymer particles from an upstream reactor to a downstream reactor comprises two parallel gas-solid separators, two parallel pressure transfer chambers, and one offgas gas compressor.

Preferably, the offgas gas compressor is a multi-stage offgas gas compressor.

Preferably, the offgas from the gas-solid separator is subjected to a second sequential gas-solid separator, wherein said second sequential gas-solid separator preferably is a cyclone.

In a further aspect of the present invention, the use of the process according to present invention or the use of the system according to present invention for producing heterophasic polypropylene is provided.

Figure 2:
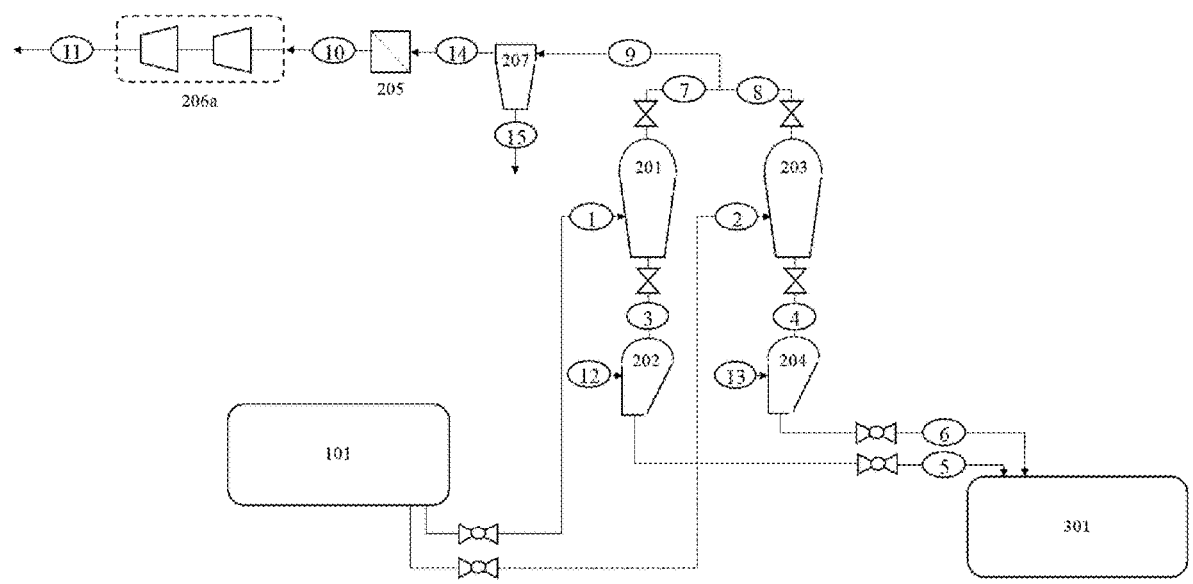
FIG. 2 illustrates a system and process according to the disclosure.
Figure 3:
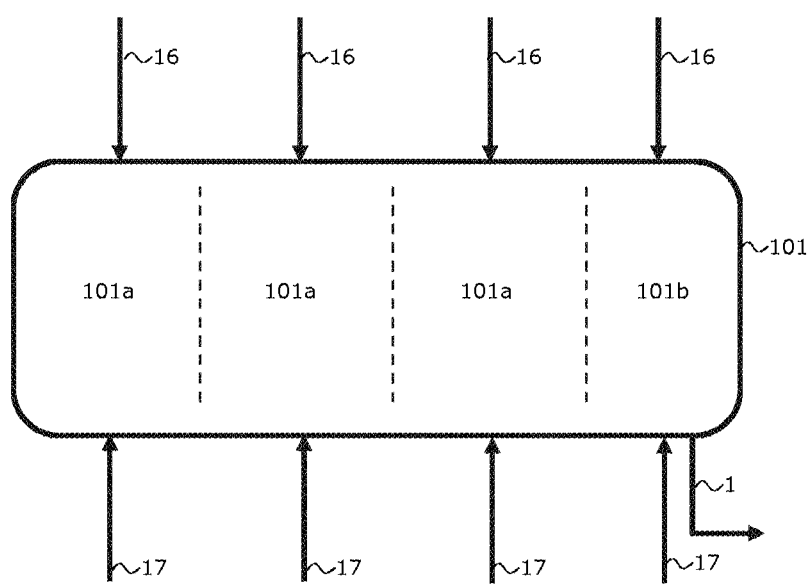
FIG. 3 illustrates a system and process according to the disclosure.

The following numerical references are used in FIGS. 1, 2 and 3:
1 Polymer powder discharge from upstream reactor (R1) to gas-solid separator
A
2 Polymer powder discharge from upstream reactor (R1) to gas-solid separator
B
3 Connection between gas-solid separator A and pressure transfer chamber A
4 Connection between gas-solid separator B and pressure transfer chamber B 5 Polymer powder discharge from pressure transfer chamber A to downstream reactor (R2)
6 Polymer powder discharge from pressure transfer chamber B to downstream reactor (R2)
7 Gas outlet from gas-solid separator A (containing finer polymer particles)
8 Gas outlet from gas-solid separator B (containing finer polymer particles)
9 Inlet stream (gas containing polymer) to the gas-solid separator overhead filters
10 Gas outlet from filter
11 Compressed gas stream (preferably to be recycled back to polymerization reactor, e.g. R1)
12 Purge and pressurization lines for blowcase A
13 Purge and pressurization lines for blowcase B
14 Gas outlet from optional additional gas-solid separator
15 Solids outlet from optional additional gas-solid separator (preferably recycled back to one or more selected from the group consisting of gas-solid separator A, gas-solid separator B, pressure transfer chamber A, pressure transfer chamber B and upstream reactor)
16 Liquid (recycle) stream(s)
17 Gas (recycle) stream(s)
101 Upstream reactor (R1)
101a Preceding reactor zone(s)
101b Polymer discharge reaction zone
201 Gas-solid separator A
202 Pressure transfer chamber A
203 Gas-solid separator B
204 Pressure transfer chamber B
205 Solid polymer particles filter (e.g. for retaining particles bigger than 2 microns)
206 Offgas gas compressor (206a optional multi-stage off-gas gas compressor)
207 Additional gas-solid separator
301 Downstream reactor (R2)

It is noted that the invention relates to all possible combinations of features described herein, particularly features recited in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The present invention will now be more fully described by the following non-limiting Examples.

EXAMPLES

The development of a detailed model of the first polymerization reactor enabled the understanding of the thermodynamic and transport phenomena occurring in this system. This model was developed in Mobatec Modeller employing correlations derived from literature (for the mass transport phenomena) and from in-house developed models (namely thermodynamic models, based on PC-SAFT) and it was fitted with plant data. The sorption of the different gas components in the amorphous PP was estimated by developing simplified empirical correlations able to mimic the behaviour predicted by PC-SAFT.

In the examples, the results on the amount of hydrogen still present in the powder at the inlet of the downstream reactor are expressed as hydrogen Take-over, which is the excess of hydrogen in the downstream reactor. In other words, "hydrogen Take-over" is "hydrogen carry-over from pressure chamber to downstream reactor" minus "hydrogen consumption in downstream reactor". This means the hydrogen Take-over could also be a negative value and additional hydrogen would need to be fed to the downstream reactor. This is a preferred situation with respect to the hydrogen/olefin control in downstream reactor.

The hydrogen Take-over in the base case is 712 g/h.

In the Examples the reactor is divided into four imaginary zones, each being ¼ or 25% of the reactor volume. The discharge zone is the last zone and comprises ¼ or 25% of the total reactor volume.

Example 1

No gas injection in polymer discharge reaction zone.

$$\frac{[H_2]_{preceding\ zone} / [Olefin\ monomer]_{preceding\ zone}}{[H_2]_{discharge\ zone} / [Olefin\ monomer]_{discharge\ zone}} = 5.4$$

Hydrogen Take-over after applying this modification: 141 g/h
Reduction in hydrogen Take-over: 80%

Example 2

Manipulate the inlet of liquid and gas recycle streams is each zone of the first reactor.

Inject the minimum gas flow rate in polymer discharge reaction zone.

Injecting the minimum gas flow rate copes with the requirements associated with the nozzle operation.

$$\frac{[H_2]_{preceding\ zone} / [Olefin\ monomer]_{preceding\ zone}}{[H_2]_{discharge\ zone} / [Olefin\ monomer]_{discharge\ zone}} = 3.2$$

Hydrogen Take-over after applying this modification: 226 g/h Reduction in hydrogen Take-over: 68%

Example 3

Inject pure gaseous propylene at the bottom of the polymer bed, instead of recycled gas.

Inject pure gaseous propylene in the polymer discharge reaction zone.

The recycled gas is injected in all 3 preceding reaction zones. The flow of pure propylene is the minimum gas flow required to avoid the nozzle blockage.

$$\frac{[H_2]_{preceding\ zone} / [Olefin\ monomer]_{preceding\ zone}}{[H_2]_{discharge\ zone} / [Olefin\ monomer]_{discharge\ zone}} = 5.6$$

Hydrogen Take-over after applying this modification: 140 g/h
Reduction in hydrogen Take-over: 80%

Example 4

Inject pure gaseous propylene at the bottom of the polymer bed (instead of recycled gas) and inject pure liquid propylene as quench, at the top of the reactor (instead of the recycled liquid).

$$\frac{[H_2]_{preceding\ zone} / [\text{Olefin monomer}]_{preceding\ zone}}{[H_2]_{discharge\ zone} / [\text{Olefin monomer}]_{discharge\ zone}} = 7.6$$

Hydrogen Take-over after applying this modification: −26 g/h

Reduction in hydrogen Take-over: 104%

The invention claimed is:

1. A continuous vapor phase olefin polymerization process comprising polymerization of at least one olefin monomer in at least two serial vapor phase polymerization reactors containing an agitated bed of forming polymer particles,
wherein forming polymer particles are transferred from an upstream reactor to a downstream reactor,
wherein the upstream reactor is a horizontal stirred reactor containing multiple reaction zones, each reaction zone having at least one inlet for a gaseous stream and optionally additionally an inlet for a liquid stream and,
wherein one reaction zone comprised in the upstream reactor vessel is a polymer discharge reaction zone from which forming polymer particles are discharged and subsequently transported to the downstream reactor and wherein the ratio of the hydrogen concentration to the olefin monomer concentration in the polymer discharge reaction zone ($[H_2]_{discharge\ zone}$/[Olefin monomer]$_{discharge\ zone}$) is reduced compared to the ratio of the hydrogen concentration to the olefin monomer concentration in the preceding reactor zone ($[H_2]_{preceding\ zone}$/[Olefin monomer]$_{preceding\ zone}$).

2. The process according to claim 1, wherein the ratio $$\frac{[H_2]_{preceding\ zone} / [\text{Olefin monomer}]_{preceding\ zone}}{[H_2]_{discharge\ zone} / [\text{Olefin monomer}]_{discharge\ zone}} \text{ is } 1.5 - 1.5.$$

3. The process according to claim 1, wherein one or more liquid streams to one or more reaction zones and/or one or more gaseous streams to one or more reaction zones are controlled to achieve the desired ratios of the hydrogen concentration to the olefin monomer concentration in the reaction zones.

4. The process according to claim 3, wherein the liquid stream to at least one reaction zone is a liquid reactor recycle stream further comprising an inert diluent or the olefin monomer.

5. The process according to claim 3, wherein the gaseous stream to at least one reaction zone comprises a gaseous recycle stream further comprising an inert diluent or the olefin monomer.

6. The process according to claim 1, wherein the liquid stream to the polymer discharge reaction zone and/or the gaseous to the polymer discharge reaction zone is propylene.

7. The process according to claim 3, wherein the propylene is polymer grade propylene consisting of at least 99.7 wt-% propylene.

8. The process according to claim 1, wherein the upstream reactor comprises an internal barrier to prevent back-mixing of the forming polymer product from the polymer discharge reaction zone to one or more other reaction zones comprised in the upstream reactor.

9. The process according to claim 1, wherein forming polymer particles are transferred from the upstream reactor to the downstream reactor in a forming polymer particles transport step comprises in a repeating sequence the steps of:

(a) discharging at least one charge of forming polymer powder and reactive gases from the upstream reactor into a gas-solid separator wherein the polymer powder is separated from the reactive gases;
(b) collecting the polymer powder separated in the gas-solid separator in a pressure transfer chamber;
(c) increasing the pressure in the pressure transfer chamber with a pressurizing gas to a pressure that is higher than the operating pressure of the downstream reactor; and
(d) discharging the polymer powder from the pressure transfer chamber into the downstream reactor, and
(e) opening the valve between the gas-solid separator and the pressure transfer chamber,
wherein the pressure in the pressure transfer chamber before said discharging at least one charge of forming polymer powder and reactive gases from the upstream reactor into the gas-solid separator is 10-700 kPaa.

10. A system suitable for a continuous vapor phase olefin polymerization process according to claim 1, comprising at least two serial vapor phase polymerization reactors containing an agitated bed of forming polymer particles and a means to transfer forming polymer particles from an upstream reactor to a downstream reactor, wherein the upstream reactor is a horizontal stirred reactor containing multiple reaction zones, each reaction zone having at least one inlet for a gaseous stream said reactor comprising multiple inlets for a gaseous stream to set different hydrogen to olefin ratios and optionally additionally an inlet for a liquid stream and wherein one reaction zone comprised in the upstream reactor is a polymer discharge reaction zone comprising an outlet for forming polymer particles to the means to transfer the forming polymer particles to the downstream reactor.

11. The system according to claim 10, wherein the means to reduce the ratio of the hydrogen concentration to the olefin monomer concentration in the polymer discharge reaction zone comprises an inlet for a liquid reactor recycle stream optionally further comprising an inert diluent or the olefin monomer.

12. The system according to claim 10, wherein the means to reduce the ratio of the hydrogen concentration to the olefin monomer concentration in the polymer discharge reaction zone comprises an inlet for a gaseous recycle stream optionally further comprising an inert diluent or the olefin monomer.

13. The system according to claim 10, wherein the upstream reactor comprises an internal barrier to prevent back-mixing of the forming polymer product from the polymer discharge reaction zone to one or more other reaction zones comprised in the upstream reactor.

14. The system according to claim 10, wherein the forming polymer particles are transferred from the upstream reactor to the downstream reactor using a polymer particles transport means comprising a gas-solid separator, a pressure transfer chamber and an offgas gas compressor, wherein the inlet of said offgas gas compressor is in continuous open gas communication with the gas-solid separator.

15. The process according to claim 1,
wherein the ratio $$\frac{[H_2]_{preceding\ zone} / [\text{Olefin monomer}]_{preceding\ zone}}{[H_2]_{discharge\ zone} / [\text{Olefin monomer}]_{discharge\ zone}} \text{ is } 2 - 10$$

wherein one or more liquid streams to one or more reaction zones and/or one or more gaseous streams to one or more reaction zones are controlled to achieve the desired ratios of the hydrogen concentration to the olefin monomer concentration in the reaction zones, wherein the liquid stream to at least one reaction zone is a liquid reactor recycle stream further comprising an inert diluent, wherein said inert diluent is one or more selected from the group consisting of nitrogen, fuel gas, methane, ethane and propane, wherein the gaseous stream to at least one reaction zone comprises a gaseous recycle stream further comprising an inert diluent, wherein said inert diluent is one or more selected from the group consisting of nitrogen, fuel gas, methane, ethane and propane, wherein the liquid stream to the polymer discharge reaction zone and/or the gaseous to the polymer discharge reaction zone is propylene, wherein the upstream reactor comprises an internal barrier to prevent back-mixing of the forming polymer product from the polymer discharge reaction zone to one or more other reaction zones comprised in the upstream reactor.

16. The process according to claim 15, wherein forming polymer particles are transferred from the upstream reactor to the downstream reactor in a forming polymer particles transport step comprises in a repeating sequence the steps of:
(a) discharging at least one charge of forming polymer powder and reactive gases from the upstream reactor into a gas-solid separator wherein the polymer powder is separated from the reactive gases;
(b) collecting the polymer powder separated in the gas-solid separator in a pressure transfer chamber;
(c) increasing the pressure in the pressure transfer chamber with a pressurizing gas to a pressure that is higher than the operating pressure of the downstream reactor; and
(d) discharging the polymer powder from the pressure transfer chamber into the downstream reactor, and
(e) opening the valve between the gas-solid separator and the pressure transfer chamber, wherein the pressure in the pressure transfer chamber before said discharging at least one charge of forming polymer powder and reactive gases from the upstream reactor into the gas-solid separator is 10-700 kPaa, preferably 90-500 kPaa and most preferably 105-200 kPaa.

17. The process according to claim 15, wherein the ratio $$\frac{[H_2]_{preceding\ zone} / [\text{Olefin monomer}]_{preceding\ zone}}{[H_2]_{discharge\ zone} / [\text{Olefin monomer}]_{discharge\ zone}} \text{ is } 3-7.$$

18. The process according to claim 15, wherein the propylene is polymer grade propylene consisting of at least 99.7 wt-% propylene.

* * * * *